United States Patent [19]

Aguirre-Villafana et al.

[11] Patent Number: 5,334,364
[45] Date of Patent: Aug. 2, 1994

[54] PROCESS FOR PURIFYING SILICA SAND

[75] Inventors: Juan-Lauro Aguirre-Villafana; Juan Leal-Gonzales, both of Nuevo Leon, Mexico

[73] Assignee: Materias Primas Monterrey, S.A. De C.V., Monterrey, Mexico

[21] Appl. No.: 38,169

[22] Filed: Mar. 26, 1993

Related U.S. Application Data

[63] Continuation-in-part of Ser. No. 706,220, May 28, 1991, abandoned.

[51] Int. Cl.$^5$ ............................................. C01B 33/12
[52] U.S. Cl. ............................................. 423/340; 51/313
[58] Field of Search ............... 423/348, 349, 340, 335; 156/DIG. 64

[56] References Cited

U.S. PATENT DOCUMENTS

| | | | |
|---|---|---|---|
| 3,297,402 | 1/1967 | Chubb | 423/340 |
| 4,401,638 | 8/1983 | Caballero et al. | 423/340 |
| 4,405,588 | 9/1983 | Caballero et al. | 423/340 |
| 4,542,003 | 9/1985 | Watkins et al. | 423/340 |

FOREIGN PATENT DOCUMENTS

| | | | |
|---|---|---|---|
| 6573726 | 4/1959 | Canada | 423/340 |
| 2111035 | 6/1983 | United Kingdom | 423/340 |

*Primary Examiner*—Olik Chaudhuri
*Assistant Examiner*—Ken Horton
*Attorney, Agent, or Firm*—Abelman, Frayne & Schwab

[57] ABSTRACT

A process for the elimination of iron from silica sand, comprising: abrasive-attritioning sand particles by subjecting the sand particles, in a single step and under dry conditions, to centrifugal rotation and simultaneously imparting an agitation with a translative eccentric movement and downstream and upstream movements causing that substantially all the sand particles be abrasive attritioned to each other wearing their surfaces to remove impurities covering said sand particles; and separating said iron impurities from said sand particles by magnetic separation, flotation or other known methods, thus simplifying the conventional processes just to one attrition step and suppressing the chemical treatment with acids or alkalis which was necessary in conventional processes.

2 Claims, 2 Drawing Sheets

PROCESS FOR PURIFYING SILICA SAND

This application is a continuation-in-part of Ser. No. 07/706,220, filed May 28, now abandoned.

BACKGROUND OF THE INVENTION

This invention refers to a process for purifying silica sand and, more particularly, to a process for the elimination of iron, aluminosilicates and other soft-type mineral particles or stains such as carbonates, sulfates and clay from silica sand particles.

Sand particles are normally contaminated with iron, aluminosilicates and other soft-type mineral particles and stains, which have to be removed for particular uses in the glass, ceramic and other product manufacturing.

One of the most difficult impurities to release from the sand particles is the iron compound normally staining said particles.

There are some methods for the elimination of iron stains from the sand particles, including transforming the iron impurities into soluble iron salts by treatment with a chemical agent such as concentrated sulfuric acid or some alkalies, and then mechanically attritioning said particles to remove said salts therefrom.

U.S. Pat. Nos. 4,405,588 and 4,401,638 (corresponding to Mexican patents 159,830 and 159,831) of Caballero et al, each respectively disclose a process for removing impurities from silica sand particles, involving several steps of attrition and a chemical attack or lixiviation step which requires a relatively great amount of water and chemical reagents such as concentrated sulfuric acid, to remove said iron stains from said sand particles.

Said chemical attack combined with said attrition steps, were absolutely necessary in said processes because of the characteristics of the attrition which were not and could not be vigorous enough in the existing methods as to remove the persistent iron stains.

Additionally, together with the sand, there are also independent hard particles of aluminosilicate which, in the previous processes, were only polished and diminished in size by said attrition steps to be subsequently eliminated by additional flotation or screening steps.

It was therefore highly desirable to simplify the process by reducing at the minimum the number of attrition steps and also by suppressing the chemical attack and suppressing or at least reducing at the minimum the consumption of water in said attrition step.

Such simplification in the process for purifying silica sand is now possible in accordance with the present invention, by providing a new abrasive-attrition step in which the sand particles are so vigorously attritioned that wears the particle surface thus removing the iron stains therefrom, which may afterwards be eliminated from the sand particles preferably by high intensity magnetic separation.

Furthermore, the characteristics of said new abrasive-attrition step are so peculiar that said sand particles are so vigorously attritioned to each other under dry conditions or under lightly humid conditions, that pulverize independent aluminosilicate and other softer contaminant particles which are finally eliminated simply by washing and/or screening.

The process for purifying silica sand, in accordance with the present invention, simplifies in this way the process by reducing, to one, the number of the conventional attrition steps, suppresses the necessity of the chemical attack and consequently the consumption of water of said chemical attack and attrition step, because the process can now be carried out under dry conditions with 100% of solids or in the presence of 0 to 10% of water, considerably reducing the consumption of water of the whole process (at about 30%) when high degree of purity is required for the sand.

SUMMARY OF THE INVENTION

It is therefore a main objective of the present invention, to provide a process for purifying silica sand, to eliminate impurities such as iron, aluminosilicates and other soft-type mineral particles or stains contaminating it.

It is another main objective of the present invention, to provide a simplified process for purifying silica sand, by providing an abrasive-attrition step which is so vigorous that wears the surface of the sand particles thus removing the iron staining them which may afterwards be easily eliminated from said sand particles.

It is also a main objective of the present invention, to provide a simplified process for purifying silica sand, of the above disclosed nature, wherein the abrasive-attrition step is so peculiar as to cause that said sand particles be so vigorously attritioned to each other under dry conditions or under lightly humid conditions that pulverize independent aluminosilicate and other soft-type mineral particles or stains which are finally eliminated simply by washing and/or screening.

It is still a main objective of the present invention, to provide a simplified process for purifying silica sand, of the above disclosed nature, which simplifies the process by reducing, to one, the number of the attrition steps of the conventional processes.

It is a further main objective of the present invention, to provide a simplified process for purifying silica sand, of the above disclosed nature, which allows to suppress the necessity of the chemical attack and consequently the consumption of water of said chemical attack and attrition step, considerably reducing the consumption of water in the whole process, when high degree of purity is required for the sand.

These and other objects and advantages of the present will be evident to the persons skilled in the art, from the teachings of the present invention described in the following detailed description of the invention, provided in combination with the accompanying drawings.

DETAILED DESCRIPTION OF THE INVENTION

In the following, the invention will be described in combination with the accompanying drawings wherein the same reference numbers refer to the same parts of the shown figures.

Figure 1:
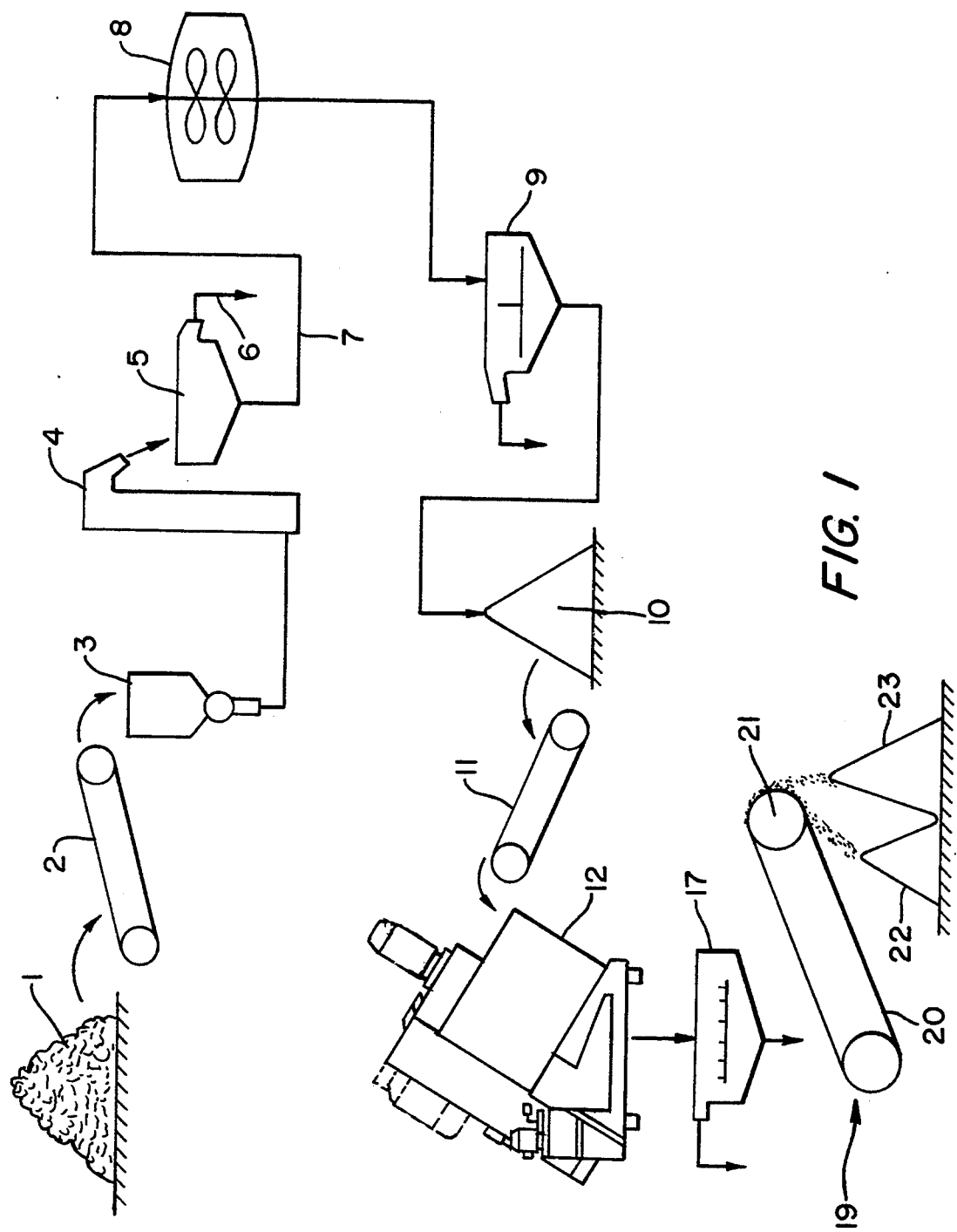
FIG. 1 is a flow sheet of the process for purifying silica sand or other materials, of the present invention.
Figure 2:
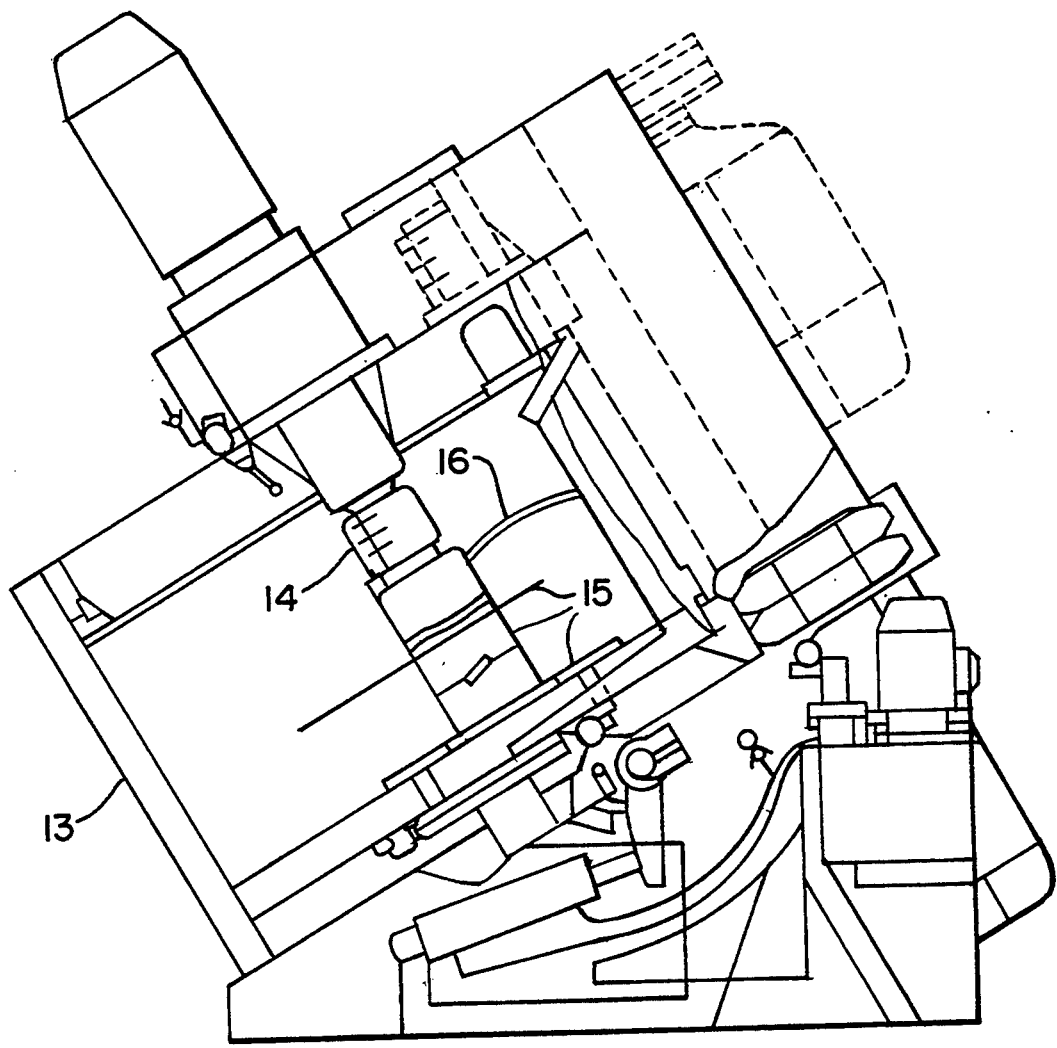
FIG. 2 is a schematic view of the apparatus for abrasive-attrition, to be used in the process of the present invention.

Referring to FIG. 1, the process for purifying silica sand and other materials, of the present invention comprises:

feeding sandstone 1 by means of conveyor 2 into a grinder or crusher 3, to uniformly reduce the size of sand particles to about −20 U.S. mesh and classifying them to remove particle fines having −200 U.S. mesh;

transferring said ground and classified sand particles by a conveyor 4, to a washing tank 5 wherein said sand particles are washed with cold water forming an aqueous suspension of clay-binder material which is extracted through line 6, whereas the heavier sand particles having still adhered some clay-binder is passed trough line 7 to an attrition scrubber 8 to deslime and release additional clay-binder;

feeding said sand particles to a deslimer 9 to finally remove the binder from said sand particles which are passed to a deposit 10;

transporting, by a conveyor 11, said deslimed sand particles from the deposit 10 to an abrasive-attritioner 12 comprising an inclined rotary recipient 13, a rotary shaft 14 placed eccentrically within recipient 13, including a plurality of rotary blades 15 at different levels thereof and a static vertical deflector 16 placed in contact with the inner wall of the rotary recipient 13;

abrasive-attritioning said sand particles by submitting them to centrifugal rotation in said rotary recipient 13 and simultaneously to agitation by said blades 15 mounted at different levels around the rotary shaft 14, which, because of its eccentric location in said recipient 13, by the centrifugal rotation of said recipient 13 and by the effect of the deflector 16, pushes the sand particles with translative eccentric movement and downstream and upstream movements causing that substantially all the sand particles be abrasive attritioned to each other wearing their surfaces to remove impurities covering said sand particles;

finally passing said sand particles from said abrasive-attritioner 12 to a washer tank 17 wherein they are washed with cold water to remove the aluminosilicates which remain as a suspension which is extracted through line 18, while the sand particles and ferrous particles separated therefrom are passed to a magnetic separator 19 comprising conveyor 20 having magnetic rollers 21 which adheres the ferrous particles which are afterwards released in deposit 22, whereas the sand particles free from iron and aluminosilicate impurities goes down by gravity immediately after the separating conveyor 20, in a deposit 23.

EXAMPLE 1

Batches of about 8 Kg. of ground and classified silica sand were treated in an intensive countercurrent mixer, normally used for mixing purposes and which was modified and adapted to be utilized in this process, using a tangential velocity of 31.2 m/seg. In this equipment two samples of sand from "Lampazos" and two samples of "Jaltipan" were processed in dry conditions with 100% of solids, varying the times of abrasive-attrition from 2.5 to 10 minutes.

The starting temperature of the sand was of 10° C. and was gradually increased at 42° C. at the first 2.5 min.; at 56° C. at the 5 min.; at 67° C. at the 7.5 min.; and finally at 75° C. at the 10 min.

The results obtained in the four tests are shown in the next table, wherein the batch of sand particles with an initial content of impurities is designed as HEAD and afterwards are shown the results after the abrasive-attrition and magnetic separation in accordance with the present invention. SAND OF "LAMPAZOS":

| | $Fe_2O_3$ | $Al_2O_3$ |
|---|---|---|
| TEST 1. | | |
| HEAD | 0.087 | 0.745 |
| ABRASIVE-ATTRITION + WASHING (#120) | 0.047 | 0.450 |
| AFTER MAGNETIC SEPARATION | 0.031 | 0.440 |
| TEST 2. | | |
| HEAD | 0.077 | 0.730 |
| ABRASIVE-ATTRITION + WASHING (#120) | 0.043 | 0.730 |
| AFTER MAGNETIC SEPARATION | 0.032 | 0.460 |
| SAND OF "JALTIPAN": | | |
| TEST 3. | | |
| HEAD | 0.200 | 0.375 |
| ABRASIVE-ATTRITION + WASHING (#140) | 0.125 | 0.150 |
| AFTER MAGNETIC SEPARATION | 0.024 | 0.150 |
| TEST 4. | | |
| HEAD | 0.200 | 0.375 |
| ABRASIVE-ATTRITION + WASHING (#140) | 0.150 | 0.180 |
| AFTER MAGNETIC SEPARATION | 0.022 | 0.170 |

EXAMPLE 2

Batches of about 8 Kg. of ground and classified silica sand were treated, similarly as Example 1, in an intensive countercurrent mixer, normally used for mixing purposes and which was modified and adapted to be utilized in this process, using a tangential velocity of 31.2 m/seg. In this equipment one sample of sand from "Lampazos" and two samples of "Jaltipan" were processed under 10% of humidity, varying the times of abrasive-attrition from 2.5 to 10 minutes.

The starting temperature of the sand was of 20° C. and was gradually increased at 40° C. at the first 2.5 min.; at 53° C. at the 5 min.; at 63° C. at the 7.5 min.; and finally at 72° C. at the 10 min.

The results obtained in the three tests are shown in the next table, wherein the batch of sand particles with an initial content of impurities is designed as HEAD and afterwards are shown the results after the abrasive-attrition and magnetic separation in accordance with the present invention. SAND OF "LAMPAZOS":

| | $Fe_2O_3$ | $Al_2O_3$ |
|---|---|---|
| TEST 1. | | |
| HEAD | 0.098 | 0.800 |
| ABRASIVE-ATTRITION + WASHING (#120) | 0.071 | 0.500 |
| AFTER MAGNETIC SEPARATION | 0.030 | 0.350 |
| SAND OF "JALTIPAN": | | |
| TEST 2. | | |
| HEAD | 0.045 | 0.210 |
| ABRASIVE-ATTRITION + WASHING (#140) | 0.042 | 0.160 |
| AFTER MAGNETIC SEPARATION | 0.018 | 0.090 |
| TEST 3. | | |
| HEAD | 0.550 | 0.220 |
| ABRASIVE-ATTRITION + WASHING (#140) | 0.047 | 0.150 |
| AFTER MAGNETIC SEPARATION | 0.019 | 0.090 |

As it is evident from the above test results, after abrasive-attrition and washing, the contents of $Al_2O_3$ is reduced approximately to one half. This is due mainly to the feldspar particles which were ground by the sand particles reduced to a powder, while in the magnetic separation practically did not reduce its content.

Regarding the impurities of $Fe_2O_3$, these were also practically reduced in half after abrasive-attrition and washing at 120 and 140 meshes, corresponding to the ferrous fine particles removed from the surface of the sand particles.

In the sand of "Lampazos", after magnetic separation, the contents of $Fe_2O_3$ were reduced additionally in a 25%, while in the sand of "Jaltipan" were reduced at 80% corresponding so much to the free ferrous minerals as to the iron particles originated by the wear of the equipment.

Finally, it must be understood that the persons skilled in the art can be able, from the teachings of the present invention, to make changes in the operation conditions and in the steps of the process which, however, will clearly be within the true spirit and scope of the invention as its is claimed in the following claims.

What is claimed is:

1. A process for purifying silica sand, consisting:
   a) abrasive-attritioning a sand particle mixture by subjecting the sand particles to centrifugal rotation under dry conditions, while simultaneously agitating the particles with translative eccentric, downstream, and upstream movements, wherein the surface impurities are removed from the sand particles, and
   b) eliminating the impurities from the sand particle mixture.

2. A process for purifying silica sand, as in claim 1, wherein the abrasive-attritioning step is carried out in the presence of 0% to about 10% humidity.

* * * * *